United States Patent
Sorensen

(10) Patent No.: US 9,907,229 B2
(45) Date of Patent: Mar. 6, 2018

(54) GRANULE CONVEYING APPARATUS

(71) Applicant: AGCO A/S, Hesston, KS (US)

(72) Inventor: Jakob Bro Sorensen, Randers (DK)

(73) Assignee: AGCO A/S, Randers (DK)

( * ) Notice: Subject to any disclaimer, the term of this patent is extended or adjusted under 35 U.S.C. 154(b) by 0 days.

(21) Appl. No.: 14/418,568

(22) PCT Filed: Jul. 5, 2013

(86) PCT No.: PCT/EP2013/001983
§ 371 (c)(1),
(2) Date: Jan. 30, 2015

(87) PCT Pub. No.: WO2014/019638
PCT Pub. Date: Feb. 6, 2014

(65) Prior Publication Data
US 2015/0201558 A1 Jul. 23, 2015

(30) Foreign Application Priority Data
Jul. 31, 2012 (GB) .................................. 1213562.0

(51) Int. Cl.
*A01D 41/12* (2006.01)
*B60P 1/42* (2006.01)
*B65G 33/14* (2006.01)

(52) U.S. Cl.
CPC ............ *A01D 41/1217* (2013.01); *B60P 1/42* (2013.01); *B65G 33/14* (2013.01)

(58) Field of Classification Search
CPC ........ A01D 41/1217; B60P 1/42; B65G 33/14
(Continued)

(56) References Cited

U.S. PATENT DOCUMENTS

| | | | | |
|---|---|---|---|---|
| 4,923,358 A | * | 5/1990 | Van Mill .................. | B60P 1/42 198/532 |
| 5,538,388 A | * | 7/1996 | Bergkamp ................ | B60P 1/42 414/523 |

(Continued)

FOREIGN PATENT DOCUMENTS

| EP | 0143108 A1 | 6/1985 |
|---|---|---|
| EP | 2123510 A1 | 11/2009 |

(Continued)

OTHER PUBLICATIONS

International Searching Authority, International Search Report prepared for International Application No. PCT/EP2013/001983, dated Oct. 14, 2013.

(Continued)

*Primary Examiner* — Anna Momper
*Assistant Examiner* — Ashley Romano

(57) ABSTRACT

Granule conveying apparatus (12) comprising two screw conveyors (21,22) are provided. Each screw conveyor comprises flighting (26,36) mounted to a shaft (27,37) and a cylindrical volume (61,62) associated therewith. Each cylindrical volume (61,62) has a length defined by the associated shaft (27,37) and a diameter defined by the associated flighting (26,36). One end of each of said two screw conveyors meet at an elbow or junction (52) where the direction of material conveyance is changed. The conveyor shafts (27,37) are supported independently from one another. The shaft of one of said two screw conveyors intersects the cylindrical volume associated with the other one of said two screw conveyors at the elbow. The close proximity of the two screw conveyors at the elbow region reduces power consumption.

6 Claims, 4 Drawing Sheets

(58) Field of Classification Search
USPC .......................................................... 414/502
See application file for complete search history.

(56) References Cited

U.S. PATENT DOCUMENTS

| | | | | |
|---|---|---|---|---|
| 6,042,326 | A * | 3/2000 | Thomas | B60P 1/42 198/674 |
| 6,248,015 | B1 * | 6/2001 | Rayfield | A01D 41/1208 460/131 |
| 6,767,174 | B2 * | 7/2004 | Cresswell | B60P 1/42 198/668 |
| 7,367,881 | B2 * | 5/2008 | Voss | A01D 41/1217 414/526 |
| 8,591,301 | B2 * | 11/2013 | Redekop | A01D 45/028 460/100 |
| 8,696,292 | B2 * | 4/2014 | Dulong | A01F 12/46 198/312 |
| 2006/0104770 | A1 | 5/2006 | Talbi et al. | |
| 2009/0290970 | A1 * | 11/2009 | Farley | B60P 1/42 414/808 |

FOREIGN PATENT DOCUMENTS

| | | |
|---|---|---|
| GB | 987568 A | 3/1965 |
| GB | 1262041 A | 2/1972 |
| GB | 1264732 A | 2/1972 |
| GB | 1417786 A | 12/1975 |
| JP | 2006345821 A | 12/2006 |

OTHER PUBLICATIONS

Intellectual Property Office, Search Report prepared for Patent Application GB12135620, dated Oct. 24, 2012.

* cited by examiner

GRANULE CONVEYING APPARATUS

BACKGROUND OF THE INVENTION

Field of Invention

The invention relates to granule conveying apparatus comprising two screw conveyors each having flighting mounted to a shaft, one end of each of said to screw conveyors meeting at an elbow, wherein the shafts are supported independently from one another.

Description of Related Art

Screw conveyors, or augers, are well known devices for conveying granular material such as grain in straight lines. A typical screw conveyor includes helical flighting mounted to a shaft which rotates in an elongated tube having an inlet and an outlet. The shaft is driven for example by an electric motor.

Multiple screw conveyors can be arranged in series to provide a non-linear conveyance path wherein the individual conveyors are joined at joints or elbows. Driving torque may be transferred from one screw conveyor to an adjacent screw conveyor via bevel gears which couple respective ends of adjacent conveyor shafts. An example of such coupling is disclosed in US Patent application publication US-2009/0290970.

Bevel gearing and the like are known to consume more power than a pair of screw conveyors which are independently supported by respective bearings. Known granule conveying apparatus having two screw conveyors meeting at an angle typically have non-aligned shafts wherein the supplying conveyor delivers granular material to a transfer chamber disposed outside the swept envelope of the second downstream conveyor. The granular material builds up in the transfer chamber sufficiently to be forced into the swept envelope of the second conveyor and conveyed thereby.

The resulting passage of the conveyed granular material adopts more than one change in direction as it moves from the supplying conveyor to the transferred chamber and across to the second conveyor and onward from there. The conveyed material passes through a 'dead zone' whilst passing from the supplying conveyor to the receiving conveyor which reduces the effectiveness of feeding the latter.

OVERVIEW OF THE INVENTION

It is an object of the invention to provide improved granule conveying apparatus with independently-supported screw conveyors having reduced power consumption and improved capacity compared to known systems.

In accordance with the invention there is provided granule conveying apparatus comprising two screw conveyors each having flighting mounted to a shaft and a cylindrical volume associated therewith having a length defined by said shaft and a diameter defined by the flighting, one end of each of said two screw conveyors meeting at an elbow, wherein said shafts are supported independently from one another and the shaft of one of said two screw conveyors intersects the cylindrical volume associated with the other one of said two screw conveyors at the elbow. Advantageously, the invention permits a more direct passage for the conveyed granular material whilst maintaining independence support for both screw conveyors.

The invention involves the recognition of the effect of the 'dead zone' through which the material passes in known conveying apparatus. Advantageously, the invention minimises the volume of the dead zone and thus reduces the chaotic nature of material transfer observed by the inventors in known apparatus.

The intersection may be permitted by providing a discontinuity in the flighting of one screw conveyor to allow the two shaft to mutually reside in close proximity.

The invention lends itself particularly well to apparatus wherein a first of the screw conveyors is substantially horizontal and a second of the screw conveyors is upright. Preferably the horizontal screw conveyor supplies the grain to the elbow and the upright screw conveyor conveys material away from the elbow.

Although applicable to any granular material, it is envisaged that the invention carries particular benefits in grain conveying apparatus and especially grain conveying apparatus integrated into a combine harvester where reduction in power consumption is particularly desirable. For example, an unloading system of a combine harvester may include a first screw conveyor arranged transversely across the combine and disposed underneath grain holding tanks and wherein an upright screw conveyor coupled thereto carries grain onward to an unloading auger.

BRIEF DESCRIPTION OF THE DRAWINGS

Further advantages of the invention will become apparent from reading the following description of a specific embodiment with reference to the appended drawings in which:—

DETAILED DESCRIPTION OF THE INVENTION

Figure 1:
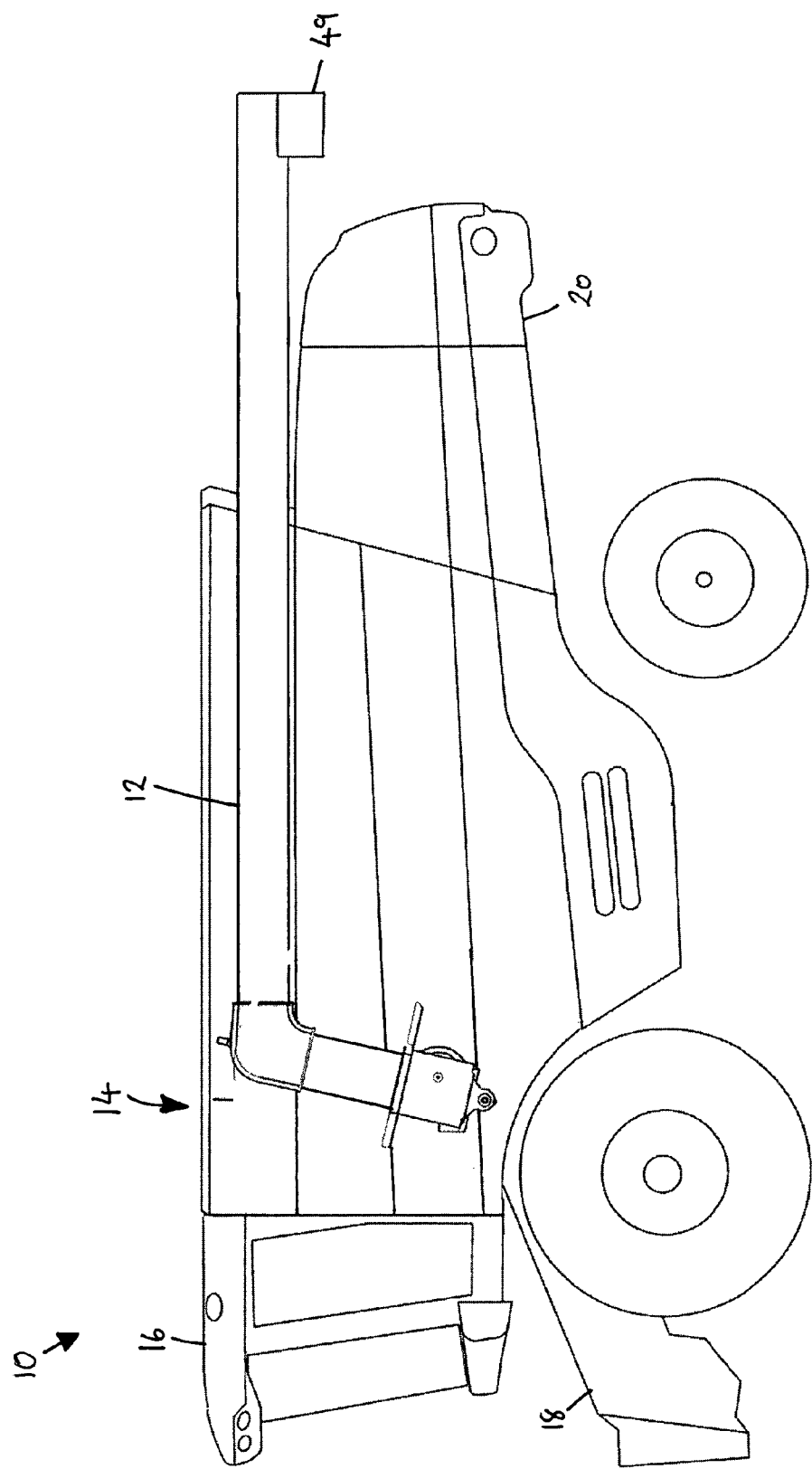
FIG. 1 is a schematic side view of a combine harvester having a grain unloading system in accordance with an embodiment of the invention.

With reference to FIG. 1, a combine harvester 10 includes an unloading system 12, grain holding tanks designated generally at 14, a driver's cab 16 and elevator housing 18 for attachment of a header (not shown). In operation the combine 10 harvests cut crop, processes the crop stream, ejects residue material (such as straw) from the rear of the machine 20 and stores clean grain in the grain holding tanks 14. When full, the grain holding tanks 14 are emptied via the unloading system 12 into a trailer (not shown) driven alongside the combine 10.

Figure 2:
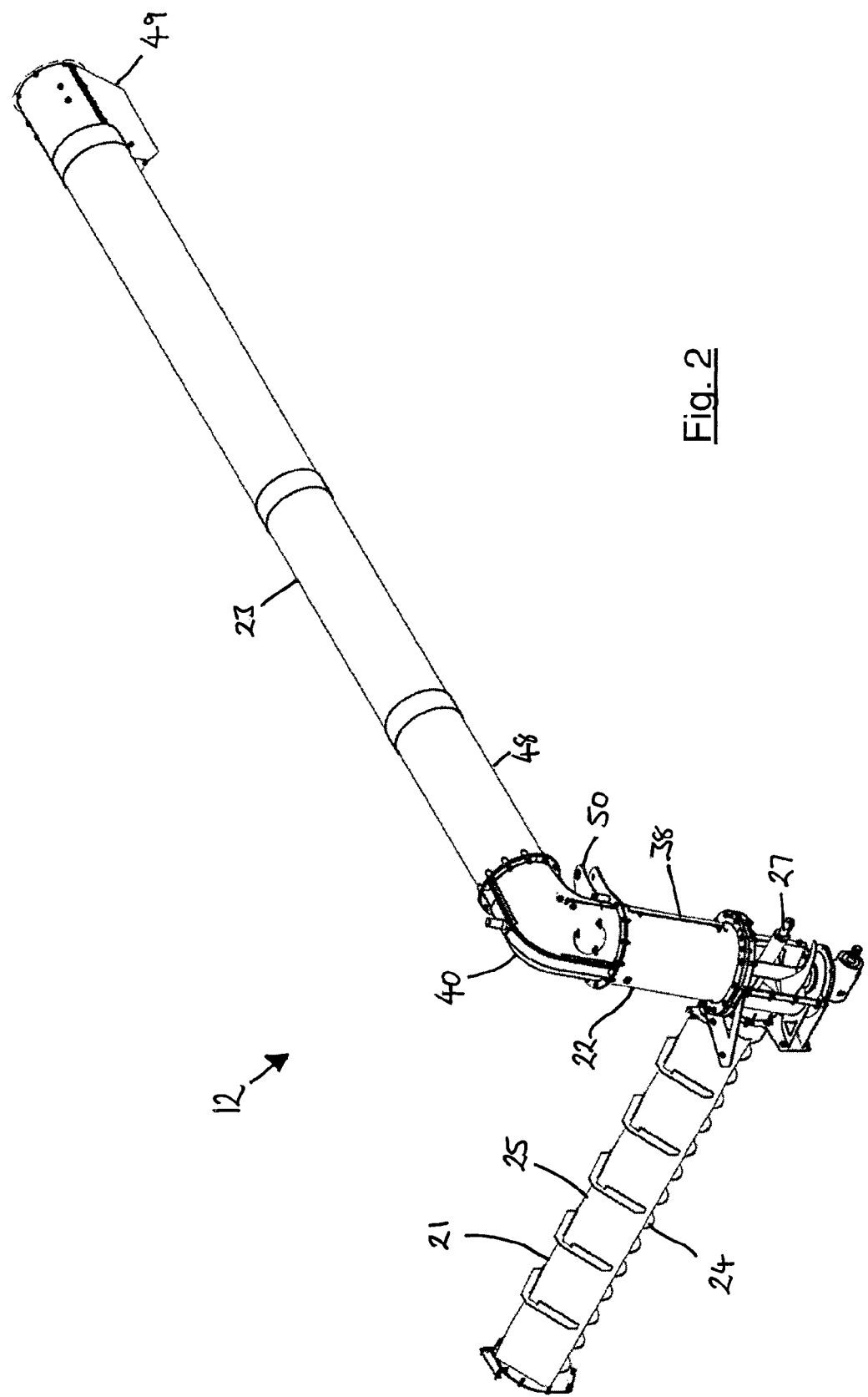
FIG. 2 is an isometric view of the grain unloading system of FIG. 1.
Figure 3:
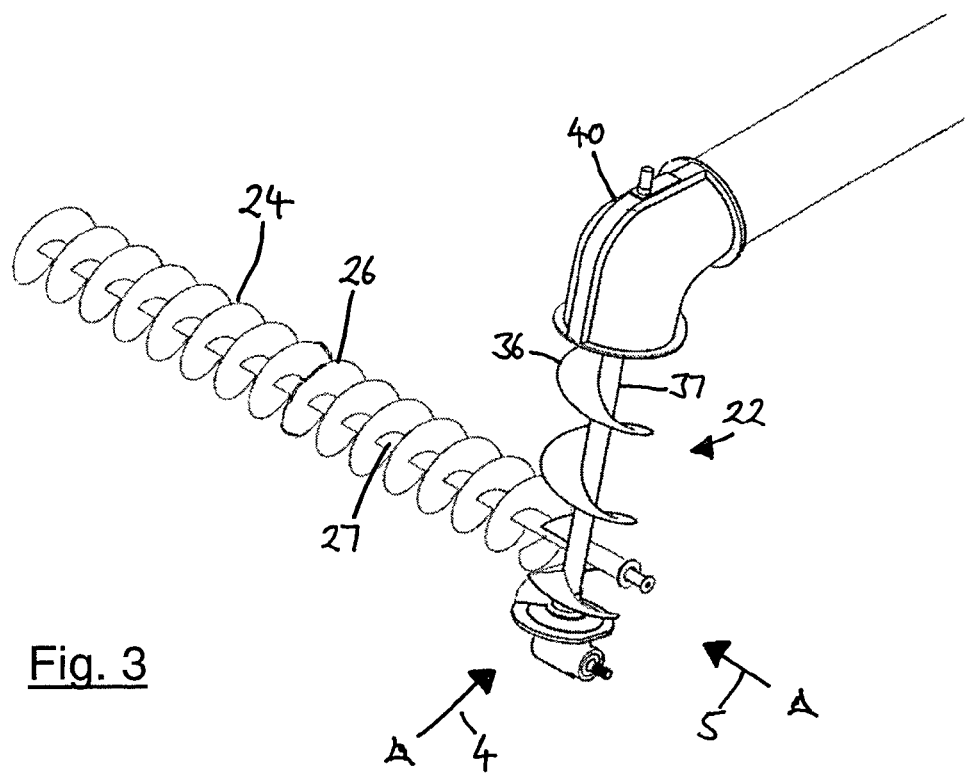
FIG. 3 is an isometric view of the grain unloading system of FIG. 2 shown with the guards removed.

Turning to FIG. 2, the grain unloading system 12 is formed from three conveyor runs 21, 22, 23 which each include a screw conveyor having helical flighting mounted to a shaft. A first conveyor run 21 is arranged transversely across the width of the combine 10 and underneath the grain holding tanks 14. The conveyor run 21 includes a transverse screw conveyor 24 which resides in a trough (not shown) and is covered by an upper guard 25. The guard 25 directs the grain to the outer edges of the trough to avoid complete saturation of the swept envelope of the screw conveyor 24.

Figure 5:
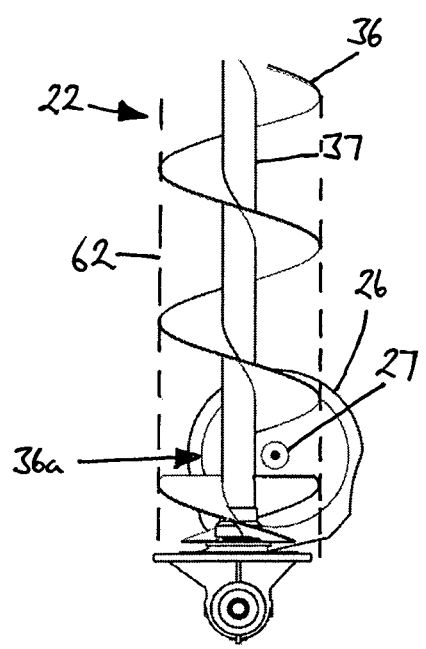

The horizontal screw conveyor 24 includes helical flighting 26 mounted to a centre shaft 27 which is supported at each end by respective bearings (not shown) mounted to the frame of the combine. Viewed from the left-hand side of the combine 10 (as shown in FIG. 5) screw conveyor 24 rotates in a counter clockwise direction to convey grain towards the base of upright conveyor 22.

Second conveyor 22 which is substantially upright, angled slightly to the rear of the combine 10, comprises a screw conveyor having flighting 36 mounted to an upright shaft 37 and housed in an elongated length of tube 38. Second conveyor 22 carries grain upwardly to the third 'delivery' auger 23 which is connected thereto by an upper elbow 40. Delivery conveyor 23 similarly includes a screw conveyor which rotates in an elongated tube 48 to convey grain to an outlet spout 49. Upper elbow unit 40 is mounted to upright tube 38 to permit rotation relative to each other so that the delivery auger 23 can be swung from a transport position (shown in FIG. 1) to an unloading position in which the tube 48 extends outwardly away from the combine 10 for unloading into a trailer. Actuating means, such as a hydraulic cylinder (not shown), are connected between the combine frame and an auger bracket 50 to swing the delivery auger 23 between the two positions.

The screw conveyor of second conveyor 22 is drivingly connected to that of the third conveyor 23 via a bevel gearing (not shown) residing in the upper elbow 40 as in known systems.

The invention concerns the junction, or 'elbow', at which the transverse grain conveyor 21 meets the upright screw conveyor 22. At this 'lower elbow region' 52 the direction of grain conveyance is changed from a substantially horizontal direction to a substantially vertically direction.

The shaft 37 of upright conveyor 22 is supported for rotation at both ends by respective bearings, the lower most being mounted to a gear box housing 54 and the top bearing being supported within housing of upper elbow 40.

Figure 4:
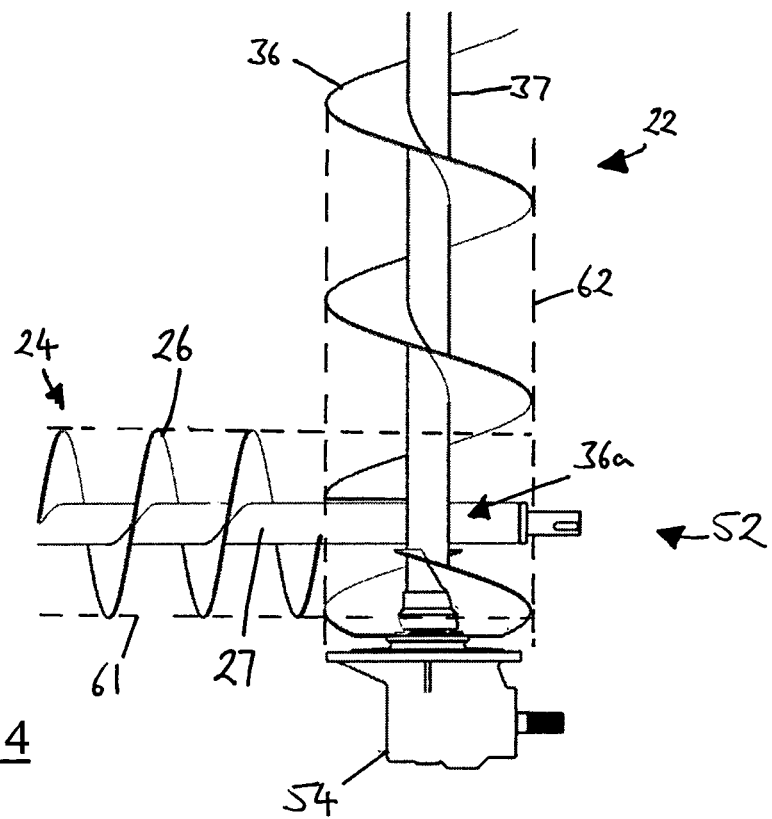
FIG. 4 is a front view of the grain conveying elbow shown in FIG. 3 and referenced by arrow '4'; and, FIG. 5 is a side view of the grain conveying elbow of FIG. 3 and referenced by arrow '5'.

Both the first conveyor 21 and second conveyor 22 have associated therewith a cylindrical volume 61, 62 respectively shown in FIGS. 4 and 5 by a dashed line. A first cylindrical volume 61 has a length defined by the first shaft 27 and a diameter defined by the radius of the flighting 26. A second cylindrical volume 62 has a length defined by the second shaft 37 and a diameter defined by the radius of the flighting 36. The cylindrical volumes 61, 62 intersect one another, or 'overlap' at the lower elbow region 52.

The overlapping of the conveyors 21, 22 is facilitated by the provision of a discontinuous flighting region 36a in the upright conveyor 22. The shaft 27 of the horizontal conveyor 21 can, therefore, pass by the vertical shaft 37 at a distance less than the radius of the vertical flighting 36. Flighting 36 is disposed on the upright shaft 37 in the second conveyor 22 both below and above the horizontal shaft 27 of the first conveyor 21.

Grain conveyed transversely by the first conveyor 21 is delivered effectively into the swept envelope of the upright conveyor 22 and is immediately redirected upwardly by the second conveyor 22. No transfer chamber is required.

It has been found that the dispensing of a transfer chamber (as in known systems) reduces the power consumption of the unloading system 12. Moreover, the independent support by a respective bearings for each of the first and second conveyors 21, 22 facilitates easier maintenance wherein only one screw conveyor need be disassembled in the event of failure.

Although described in relation to an unloading system in a combine harvester, it is envisaged that the invention can be applied to other screw conveyors for granular material. For example, a grain distribution system for silos may adopt overlapping screw conveyors at elbow joints. Similarly, the invention is applicable to other granular materials such as granular minerals or fertiliser in various applications.

In summary, granule conveying apparatus comprising two screw conveyors are provided. Each screw conveyor comprises flighting mounted to a shaft and a cylindrical volume associated therewith. The cylindrical volume has a length defined by the associated shaft and a diameter defined by the associated flighting. One end of each of said two screw conveyors meet at an elbow or junction where the direction of material conveyance is changed. The conveyor shafts are supported independently from one another. The cylindrical volumes overlap one another at the elbow region. The close proximity of the two screw conveyors at the elbow region reduces power consumption and increases capacity.

The invention claimed is:

1. Granule conveying apparatus comprising two screw conveyors each having flighting mounted to a shaft and a cylindrical volume associated therewith having a length defined by said shaft and a diameter defined by the flighting, one end of each of said two screw conveyors meeting at an elbow, wherein said shafts are supported independently from one another and the shaft of each of said two screw conveyors intersects the cylindrical volume associated with the other one of said two screw conveyors at the elbow, wherein one of said two screw conveyors comprises a discontinuous flighting region through which the shaft of the other of said two screw conveyor passes such that said one of said two screw conveyors has flighting disposed on its shaft on both sides of the discontinuous flighting region and the shaft of the other of said two screw conveyors passes by the shaft of said one screw conveyor at a distance less than a radius of the said flighting.

2. Granule conveying apparatus according to claim 1, wherein said two screw conveyors comprise a first screw conveyor which is substantially horizontal and a second screw conveyor which is upright.

3. Granule conveying apparatus according to claim 2, wherein said screw conveyors are arranged to convey granular material from said first screw conveyor to said second screw conveyor.

4. Granule conveying apparatus according to claim 3, wherein the flighting of the second screw conveyor extends into the cylindrical volume associated with the first screw conveyor.

5. A combine harvester comprising granule conveying apparatus comprising two screw conveyors each having flighting mounted to a shaft and a cylindrical volume associated therewith having a length defined by said shaft and a diameter defined by the flighting, one end of each of said two screw conveyors meeting at an elbow, wherein said shafts are supported independently from one another and the shaft of each of said two screw conveyors intersects the cylindrical volume associated with the other one of said two screw conveyors at the elbow, wherein one of said two screw conveyors comprises a discontinuous flighting region through which the shaft of the other of said two screw conveyor passes such that said one of said two screw conveyors has flighting disposed on its shaft on both sides of the discontinuous flighting region and the shaft of the other of said two screw conveyors passes by the shaft of said one screw conveyor at a distance less than a radius of the said flighting.

6. The combine harvester according to claim 5, further comprising grain holding tanks and an unloading system which includes said granule conveying apparatus, the first screw conveyor arranged transversely across the combine and disposed underneath the grain holding tanks.

* * * * *